United States Patent
Cavanaugh

(10) Patent No.: US 11,122,340 B2
(45) Date of Patent: Sep. 14, 2021

(54) SYSTEMS AND METHODS FOR IP-BASED ASSET PACKAGE DISTRIBUTION FOR PROVISIONING TARGETED ADVERTISEMENTS

(71) Applicant: Dish Network L.L.C., Englewood, CO (US)

(72) Inventor: Michael J. Cavanaugh, Glenwood Springs, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 15/951,512

(22) Filed: Apr. 12, 2018

(65) Prior Publication Data
US 2019/0320238 A1  Oct. 17, 2019

(51) Int. Cl.
| | |
|---|---|
| H04N 21/81 | (2011.01) |
| G06Q 30/02 | (2012.01) |
| H04N 21/45 | (2011.01) |
| H04N 21/442 | (2011.01) |
| H04N 21/61 | (2011.01) |
| H04N 21/643 | (2011.01) |

(52) U.S. Cl.
CPC ....... *H04N 21/812* (2013.01); *G06Q 30/0251* (2013.01); *H04N 21/44209* (2013.01); *H04N 21/4532* (2013.01); *H04N 21/6143* (2013.01); *H04N 21/6193* (2013.01); *H04N 21/64322* (2013.01)

(58) Field of Classification Search
CPC .......... H04N 21/812; H04N 21/44209; H04N 21/4532; H04N 21/6143; H04N 21/6193; H04N 21/64322; G06Q 30/0251

USPC .......................................................... 725/64
See application file for complete search history.

(56) References Cited

U.S. PATENT DOCUMENTS

| | | | | |
|---|---|---|---|---|
| 6,757,661 | B1 * | 6/2004 | Blaser | G06Q 30/02 705/14.54 |
| 7,577,979 | B2 * | 8/2009 | Feinleib | H04N 7/163 709/217 |
| 8,234,350 | B1 * | 7/2012 | Gu | H04N 21/234309 709/203 |
| 2002/0052969 | A1 | 5/2002 | Fujiwara | |
| 2002/0083441 | A1 | 6/2002 | Flickinger et al. | |

(Continued)

OTHER PUBLICATIONS

International Search Report and the Written Opinion of the International Searching Authority for PCT/US2019/025780 dated Jun. 24, 2019.

*Primary Examiner* — Nnenna N Ekpo
(74) *Attorney, Agent, or Firm* — Perkins Coie LLP

(57) ABSTRACT

Embodiments are related to faster provisioning of targeted advertisements at a set-top box (STB) via an Internet Protocol (IP) connection between the STB and a remote server. The disclosed IP-based advertisement distribution system enables targeted advertisements to be pulled from the remote server efficiently, causing the advertisements to be made available within a short time frame (e.g., less than one day from the time when the advertisements are available). The disclosed methods enables a STB to determine whether to retain existing targeted advertisements, discard them, or provision newly-available advertisements. The targeted advertisements can depend on various factors such as demographic information of an owner of the STB, lifestyle information of the owner of the STB, etc.

20 Claims, 6 Drawing Sheets

(56) References Cited

U.S. PATENT DOCUMENTS

2004/0003402 A1\* 1/2004 McKenna, Jr. .... H04N 21/4438
  725/46
2009/0210899 A1 8/2009 Lawrence-Apfelbaum et al.

\* cited by examiner

SYSTEMS AND METHODS FOR IP-BASED ASSET PACKAGE DISTRIBUTION FOR PROVISIONING TARGETED ADVERTISEMENTS

BACKGROUND

In recent times, targeted advertising on television has become popular for advertisers to reach consumers. Targeted advertising (alternately referred as "addressable advertising") relies on the ability of advertisers to utilize cable and/or satellite services to pinpoint specific households and/or subscribers. But, traditional television advertising lack the precision to determine the appropriate audience to deliver an advertisement for the advertisement to be effective. On the contrary, targeted advertising allow advertisers to determine who, when, and where to deliver an advertisement. In some instances, targeted advertising can be lucrative for marketers that don't normally advertise on television due to budget constraints or because there's no efficient way to reach their niche audience.

Typically, when targeted advertising is transmitted over satellite services, approximately 7000-8000 advertisements are actively broadcast at any given time. Of these large number of advertisements, an estimated 200-300 advertisements are usually relevant to an average household or a subscriber. Thus, a set-top box (STB) receiving the actively broadcast advertisements have to parse through a large number of undesired advertisements to determine the advertisements relevant to a subscriber of the STB. Parsing a large number of advertisements not only takes time (about three days on average) but also delays provisioning or final rollout of the advertisements to the consumer. As a result, advertisers are not able to present their brands to consumers by a certain date. Accordingly, there is a need for systems and methods that improve rollout or provide faster provisioning of targeted advertisements.

SUMMARY

Disclosed embodiments are directed at systems, methods, and apparatus for faster provisioning of targeted advertisements at a set-top box (STB) via an Internet Protocol (IP) connection between the STB and a remote server. The method includes monitoring an announcement stream on a satellite connection (e.g., between the remote server and the STB), wherein the announcement stream is a broadcast announcing a list of available advertisement packages, wherein each advertisement package is a bundled collection of an advertisement delivery request (ADR) file and advertisement media files applicable for playing at the STB; updating a lookup table locally stored at the STB based on monitoring the announcement stream, wherein the lookup table includes information identifying the list of the available advertisement packages; providing an ID of each advertisement package listed in the lookup table to the remote server; receiving an ADR file corresponding to the ID of each advertisement package listed in the lookup table, wherein the ADR file includes identifiers (ADR IDs) of advertisement media files and metadata associated with each ADR ID; for each advertisement package listed in the lookup table and for each ADR ID in the ADR file of the advertisement package, correlating targeted advertisement data with the metadata associated with the ADR ID to determine ADR IDs of relevant advertisement media files that are pertinent to the STB; comparing (i) the ADR IDs of relevant advertisement media files that are pertinent to the STB with (ii) previously-stored advertisement media files in the STB to identify one or more missing ADR IDs, wherein the one or more missing ADR IDs correspond to advertisement media files that are not stored in the STB; and requesting advertisement media files corresponding to the one or more missing ADR IDs from the remote server for storage at the STB.

DETAILED DESCRIPTION OF THE DRAWINGS

Figure 1:
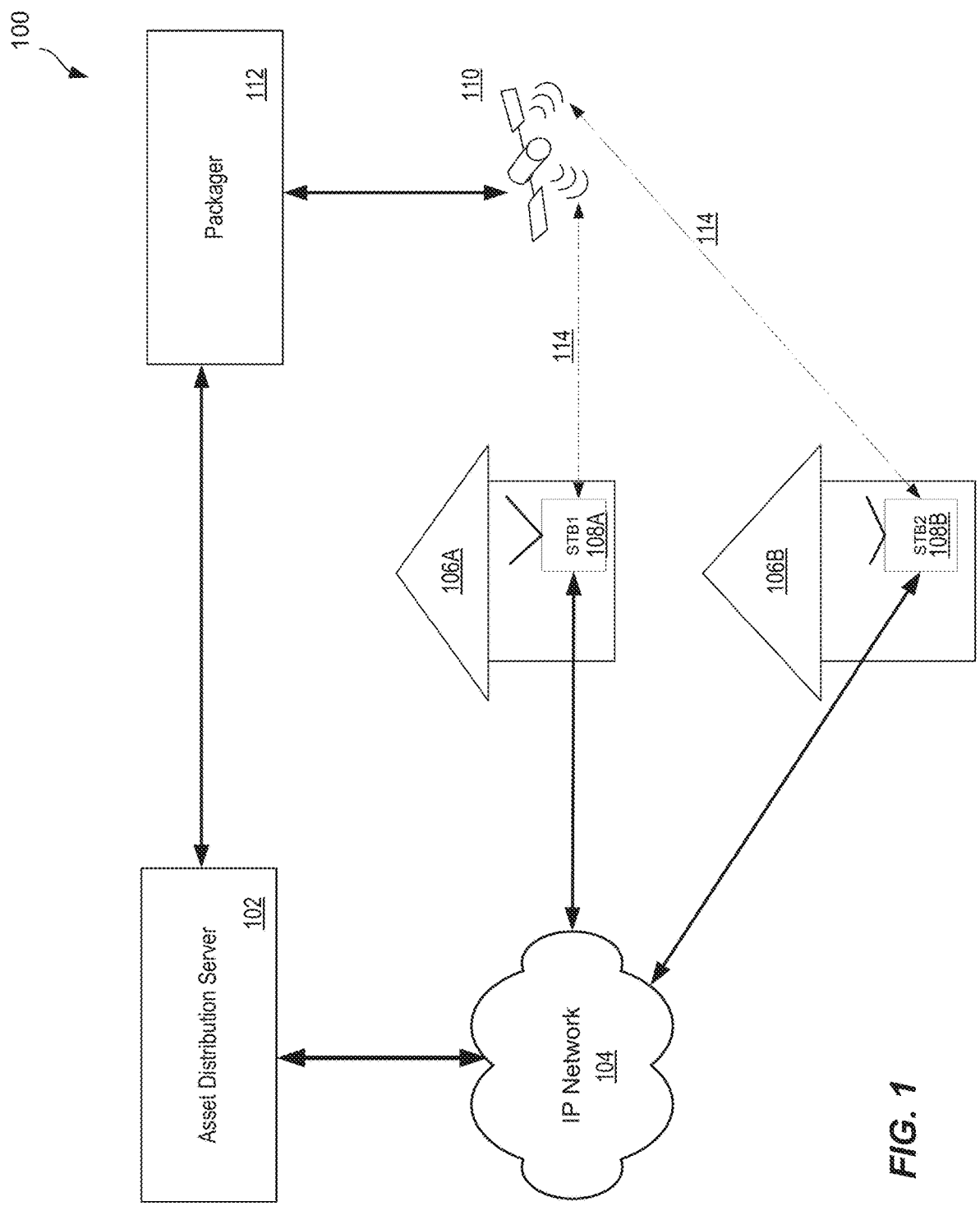
FIG. 1 illustrates a representative operation of the disclosed IP-based asset package distribution system, according to some embodiments of the disclosed technology.

The following detailed description of the invention is merely exemplary in nature and is not intended to limit the invention or the application and uses of the invention. Furthermore, there is no intention to be bound by any theory presented in the preceding background or the following detailed description.

The various embodiments described herein generally provide apparatus, systems and methods related to IP-based distribution of advertisement packages for cable or satellite services. Specifically, disclosed embodiments are directed at facilitating faster provisioning of targeted advertisements at a set-top box (STB) via an Internet Protocol (IP) connection between the set-top box and a remote server. One of the patentable benefits of the disclosed technology is that targeted advertisements can be made available within a short time frame (e.g., less than one day) which is an improvement over the three day minimum time provided by present day technology. In some embodiments, the disclosed technology allows a STB to decide which advertisements to retain on the STB's local storage, which ones to discard, and which new advertisements to procure. This has the advantage of efficient memory usage of the STB by freeing up memory that would otherwise have been utilized by advertisements that are undesired or not deemed relevant to a STB.

Next, an illustrative example of the disclosed technology is discussed. Based on tracking an environment of operation surrounding a STB, the STB may determine that the subscriber associated with the STB lives in Arlington and is shopping for luxury vehicles. In a hypothetical scenario, the STB may be aware (e.g., by scanning metadata in an advertisement file received from a remote server) that the local Lexus dealership is running a television advertisement that indicates a promotional offer for Arlington residents.

When the subscriber associated with the STB is viewing ESPN, the STB may insert the advertisement of the local Lexus dealer for presentation to the subscriber. Furthermore, in some instances it is possible that the STB may insert this advertisement in lieu of a national television commercial run by Lexus. (That is, it is possible that an advertiser can run national advertisements and local advertisements in parallel.) If the STB can present the advertisement from the local Lexus dealership within a day of the advertisement being made available, this can lead to the local Lexus marketer getting the ability to place its offer in front of the subscriber (who is a consumer from the perspective of the local Lexus dealership) within a short time. This is highly desirable for the local Lexus dealership. Indeed, there is significant interest in developing systems and methods that can provision advertisements faster. Embodiments of the technology disclosed herein are directed at an IP-based targeted advertisement distribution system that achieves faster provisioning of targeted advertisements.

In addition to improving faster provisioning of targeted advertisements, the disclosed IP-based targeted advertisement distribution system can provide enhanced network reliability. In some scenarios, an older model of a STB may not be equipped with Internet Protocol (IP) functionality, a feature usually available in newer STB models. The disclosed targeted advertisement distribution system is backwards compatible. By providing a backup satellite connection, the disclosed targeted advertisement distribution system is able to work with older STB models in provisioning targeted advertisements.

Furthermore, in some scenarios, STBs that are equipped with IP ports can be subjected to network failures. The backup satellite connection provides contingency for providing targeted advertisements under unforeseen network malfunctions. Accordingly, the dual connectivity via satellite and IP provides improved reliability and backwards compatibility. Other aspects, implementations, objects, and advantages of the disclosed technology will be apparent based on the following drawings and detailed description.

Embodiments of the disclosed technology can be owned and operated by media companies such as a cable company, a satellite broadcasting company, a television network, an on-demand media streaming service, a pay-per-view media streaming service, and/or an over-the-top media streaming service.

Turning now to the figures, FIG. 1 illustrates a representative operation of the disclosed IP-based targeted advertisement distribution system 100. FIG. 1 shows the asset distribution server 102 connected via an IP network 104 to STB 1 (denoted 108A), and STB 2 (denoted 108B). STB 1 and STB 2 are located in locations 106A and 106B. Locations 106A and 106B can be a household, a mall, a hotel, a restaurant, or any other facility.

STB 1 and STB 2 are connected to satellite 110 (e.g., a geostationary satellite). STB 1 or STB 2 monitors a stream (e.g., stream 114) associated with satellite 110 to build a lookup table. The monitoring can be performed on a temporal basis, e.g., continuously, periodically, or intermittently. STB 1 and STB 2 may be equipped with various wired and wireless network interfaces such as an Ethernet module, an external or integrated Wifi module, a ultra-wide band (UWB) module and/or a Bluetooth module. The STB can also be equipped with coax, fiber, composite video, and/or high-definition multimedia interface (HDMI). An illustrative example of STB 1, or STB 2 may be the Hopper® set top box device available from DISH Network L.L.C. of Englewood, Colo. Another example of STB 1 or STB 2 is the Joey® set top box device available from DISH Network L.L.C. Another exemplary example of STB 1 or STB 2 is the DISH Anywhere application that operates on a mobile phone or tablet. The disclosed technology is not limited to the Hopper/Joey environment, however, and equivalent concepts could be applied in any number of other products from any number of other suppliers. IP network 104 can be part of a wide area network, a local area network, a private network, a mobile communication system, a terrestrial television network, a cable television network, and/or a satellite television network. The amount of bandwidth consumption by IP network 104 or by satellite 110 is low. For example, if the IP network 104 transfers 15-30 advertisement media files per day, that would be transferring about 450-900 MB of data.

Asset distribution server 102 is a remotely-located server that operates as a physical server or a cloud server. Asset distribution server 102 stores asset files such as advertisement media files that can be formatted in a suitable audiovisual format. Exemplary audiovisual formats include Motion Picture Experts Group (MPEG) standards and the like. The advertisement media files can also include textual content. In some embodiments, multiple advertisements can be bundled together in package (e.g., by packager 112, which is connected to the asset distribution server 102 and satellite 110). The packages are also referred herein as asset packages or advertisement packages. In some applications, a portion of the advertisements in an advertisement package may be relevant to a STB. In some applications, all the advertisements in advertisement package may be relevant to a STB.

The discussions in FIG. 1 are for exemplary purposes. Embodiments of the present technology do not impose any restriction on the number of STBs, model types of the STBs, or the manufacturers of the STBs. Further, in alternate embodiments, embodiments of the disclosed technology can be associated with other electronic devices besides STBs. For example, the disclosed IP-based targeted advertisement distribution system can be associated with mobile phones, tablets, routers, access points, or other suitable electronic devices.

Figure 2:
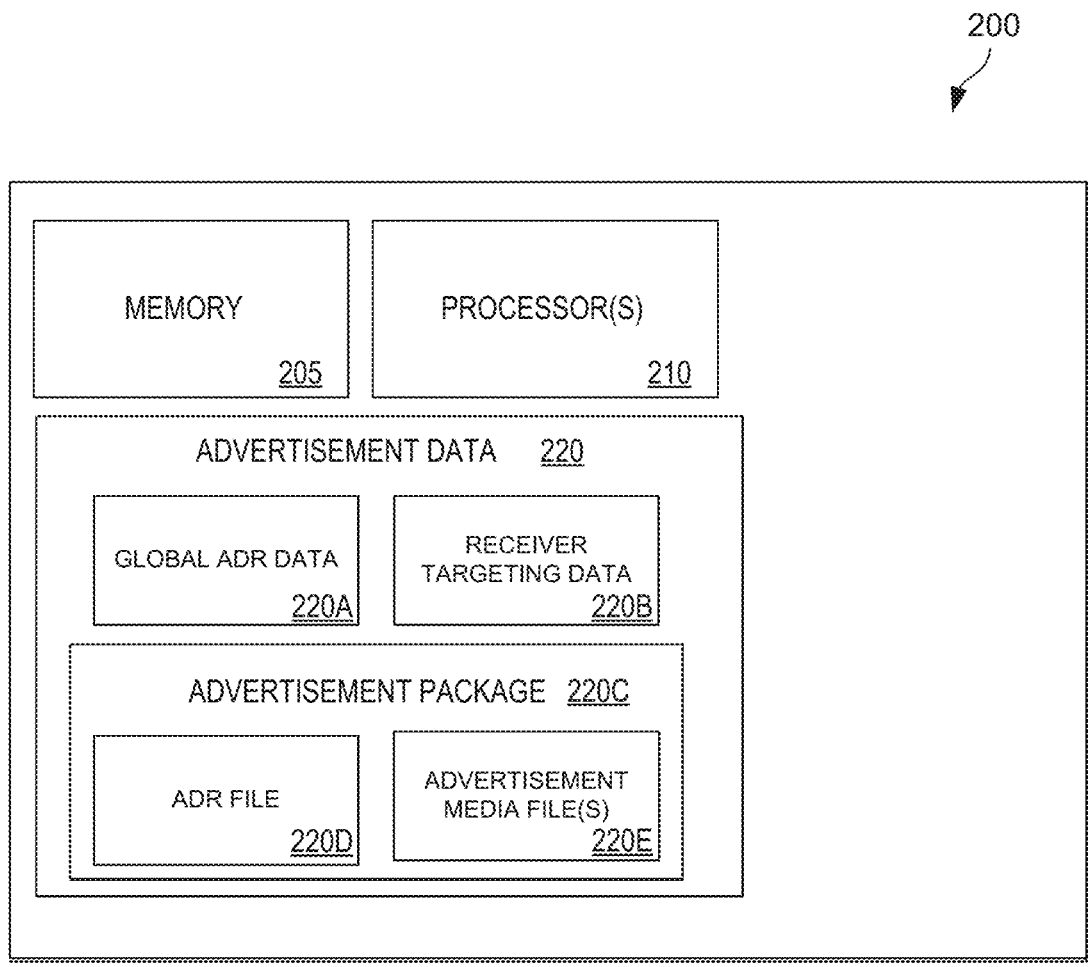
FIG. 2 illustrates an example architecture of a remote server associated with the IP-based asset package distribution system, according to some embodiments of the disclosed technology.

FIG. 2 illustrates an example architecture 200 of a remote server associated with the IP-based asset package distribution system, according to some embodiments of the disclosed technology. According to the embodiments shown in FIG. 2, the disclosed system (e.g., configured as one or more physical servers or cloud servers) can include memory 205, one or more processors 210, and advertisement data 220. Advertisement data 220 includes global ADR data 220A, receiver targeting data 220B, and advertisement package 220C. Advertisement package 220C includes ADR file 220D and advertisement media file(s) 220E. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of advertisement data 220. Generally, memory 205 can include any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

In some embodiments, advertisement package 220C can be in a compressed form. In some embodiments, advertisement package 220C can be in an uncompressed form, e.g., include MPEG files.

In some embodiments, embodiments of the disclosed technology employ multiple data types for delivery of targeted advertisements. In some applications, these data types can be stored and/or transmitted to STBs in a compressed format. Each data type has certain features that will be better understood in the discussions that follow. Advertisement data 220 includes global advertisement delivery request (ADR) data 220A, receiver targeting data 220B, and advertisement package 220C. Advertisement package 220C includes ADR file 220D and advertisement media file(s) 220E.

Global ADR data 220A is a global data type that is typically common to all STBs associated with the disclosed system. Global ADR data 220A can be, for example, configurational data that is sent to STBs on a periodic basis, e.g., daily.

Receiver targeting data 220B (also referred to herein as targeted advertisement data) is applicable for use in determining the targeted advertisements. Receiver targeting data 220B can be based on STB-specific attributes such as a geographical region where the STB is located, past-viewed programming content on the STB, demographic information of an owner of the STB, lifestyle information of the owner of the STB, and the like. Receiver targeting data 220B enables the STB to determine which advertisements to retain, which ones to discard, and which new advertisements to procure. For example, if a subscriber likes luxury vehicles, pizzas, and traveling, receiver targeting data 220B represents such preferences. In some embodiments, receiver targeting data 220B is stored on the hard drive of the STB so it can be retained after a reboot. In some embodiments, receiver targeting data 220B can also be stored in non-volatile memory or Flash memory.

Advertisement package 220C is a package that includes ADR file 220D (also referred to herein as advertisement delivery file) and multiple advertisement media file(s) 220E. ADR file 220D specifies a collection of ADR IDs and the metadata for each ADR ID. There can be multiple advertisement packages 220C in the server. Metadata associated with each ADR ID specifies additional information about one or more advertisements associated with each ADR ID.

Advertisement media file(s) 220E are the media files associated with an advertisement. Thus, an advertisement can be represented as a logical item with multiple media files associated with it. Playing an advertisement would include playing one or more of the media files. Although termed as media files, it is contemplated that a "media file" can be used to describe a file having either (or, both) textual and non-textual content. Advertisement media file(s) 220E are typically named uniquely so that the STB can identify them for provisioning. An average advertisement media file 220E can be 20 MB for a 30 second high definition video. Advertisement media file(s) can be provided by advertisers to the remote server.

Figure 3:
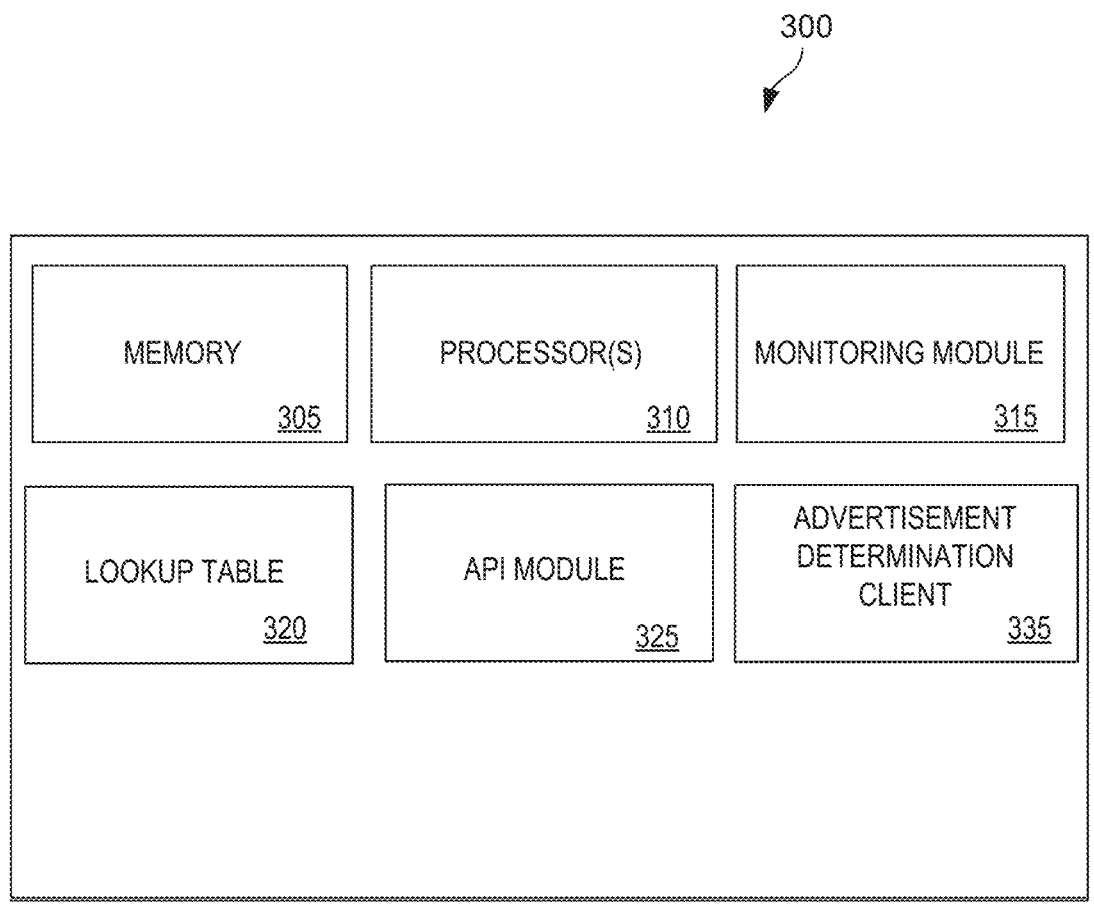
FIG. 3 illustrates an example architecture of a STB associated with the IP-based asset package distribution system, according to some embodiments of the disclosed technology.

FIG. 3 illustrates an example architecture 300 of a STB associated with the IP-based asset package distribution system. According to the embodiments shown in FIG. 3, the disclosed system (e.g., configured as one or more physical servers or cloud servers) can include memory 305, one or more processors 310, monitoring module 315, lookup table 320, API module 325, and advertisement determination client 335. Memory 305 and processor 310 are similar to memory 205 and processor 210 discussed in connection with FIG. 2. Monitoring module 315 monitors a stream associated with the satellite connection to build/update lookup table 320. The monitoring can be performed on a temporal basis, e.g., continuously, periodically, at scheduled intervals, at intermittent intervals, or based on some other temporal logic.

In some embodiments, lookup table 320 can be updated by an advertisement determination client application 335 communicably coupled to the STB. Lookup table 320 can include information identifying advertisement packages pertinent to a STB.

In some embodiments, the STB (e.g., API module 325) requests the remote server for the ADR file (alternatively referred to herein as advertisement delivery file). Upon receiving the ADR file, the STB (e.g., the advertisement determination client application 335) parses the ADR file to identify ADR IDs based on correlating the metadata included in the ADR file with the metadata associated with the targeted advertisement data stored in the STB to determine advertisement media files that are a "good fit" or otherwise pertinent for the STB.

In some embodiments, the request for advertisement media files is sent via an application programing interface (API) module 325 electronically coupled to the STB. The request may also include information identifying the STB.

Figure 4:
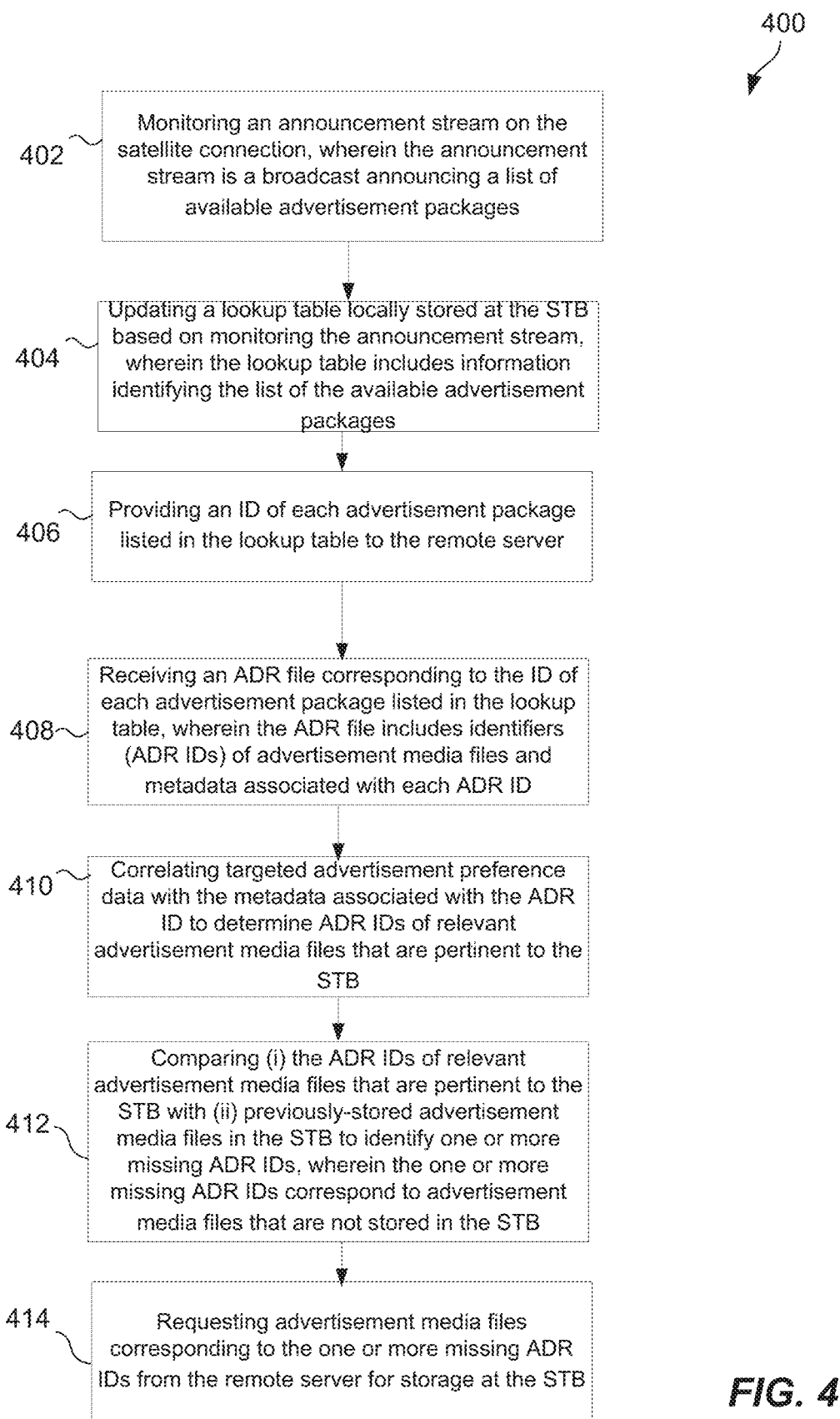
FIG. 4 illustrates a flow diagram showing a process associated with facilitating faster updates of targeted advertisements at a set-top box (STB) via an Internet Protocol (IP) connection between the set-top box (STB) and a remote server, according to some embodiments of the disclosed technology.

FIG. 4 illustrates a flow diagram showing a STB process 400 associated with facilitating faster provisioning of targeted advertisements at a set-top box (STB) via an Internet Protocol (IP) connection between the set-top box (STB) and a remote server. In some embodiments, the STB is configured to have a satellite connection in addition to the IP connection. The IP connection between the STB and the remote server can be a primary connection for STB's that are connected to the Internet. In some embodiments, the IP connection is a scalable connection that is agnostic to a total number of STBs deployed in a geographical territory. The IP connection may be secured via a Secure Sockets Layer (SSL) connection for encrypting the advertisement media files. STB's that do have Internet connectivity (e.g., some STB's may not have IP ports) or, in an event of a failure in the IP connection, the STB establishes connectivity via the satellite connection. At step 402, the process monitors (e.g., via the satellite or the IP connection) an announcement stream on the satellite connection. The announcement stream is a broadcast stream announcing one or more advertisement packages available from the remote server. An advertisement package, as discussed herein, is a bundled collection of a file and one or more advertisement media files. In some embodiments, this file is called an "advertisement delivery request (ADR) file." An advertisement media file can be in any format and can include video files, audio files, text files, or other suitable files that encourage viewers to interact and engage with the content. In some instances, advertisement media files can be in a compressed format. The monitoring of the announcement stream by the STB process can be at periodic intervals, intermittent intervals, or on-demand. At step 404, the process updates a lookup table locally stored at the STB, based on monitoring the announcement stream. The lookup table is updated with information identifying the list of the available advertisement packages for potential acquisition by the STB. Examples of the information identifying the list of the available advertisement packages can include: an advertisement package ID, names and types of advertisement media files associated with an advertisement package, a time of acquisition of an advertisement package, and an indication of whether an advertisement package is available via the satellite connection or the IP connection. At step 406, the process provides ID's of each advertisement package listed in the lookup table to the remote server. In response to providing the advertisement package ID's, the process receives (at step 408) from the remote server, an ADR file including ADR IDs of advertisement media files and metadata associated with each ADR ID. In some embodiments, the metadata associated with each ADR ID is based on: an order of playout of the targeted advertisements, a geographic location where the STB is located, tags denoting "targeted advertisement data," a priority of a targeted advertisement, a start/end date of the targeted advertisement, and a maximum number of playouts of the targeted advertisement. In some embodiments, the STB receives targeted advertisement data (e.g., receiver targeting data 220B discussed in FIG. 2), which can be stored in a storage location electronically coupled to the STB, wherein the storage location includes non-volatile memory, Flash memory, DRAM memory, or a hard drive. The targeted advertisement data maybe updated on a temporal basis, and maybe based on: a model type of the STB, a geographical region where the STB is located, past-viewed programming content on the STB, demographic information of an operator of the STB, and lifestyle information of the operator of the STB. In some embodiments, the metadata associated with each ADR ID is based on: an order of playout of the targeted advertisements, a geographic location where the STB is located, tags denoting the targeted advertisement data, a priority of a targeted advertisement, a start/end date of the targeted advertisement, and a maximum number of playouts of the targeted advertisement. For each advertisement package listed in the lookup table and for each ADR ID in the ADR file of the advertisement package, the process correlates (at step 410) the targeted advertisement data with the metadata associated with the ADR ID to determine ADR IDs of relevant advertisement media files that are pertinent to the STB. At step 412, the process compares (i) the ADR IDs of relevant advertisement media files that are pertinent to the STB with (ii) previously-stored advertisement media files in the STB to identify one or more missing ADR IDs, where the one or more missing ADR IDs correspond to advertisement media files that are not stored in the STB. At step 414, the process requests advertisement media files corresponding to the one or more missing ADR IDs from the remote server for storage at the STB. In some embodiments, the satellite connection includes an additional reception stream, wherein the additional reception stream includes: (i) break data specifying potential advertisements to be played in an upcoming commercial break and (ii) cue data specifying a play out time in the upcoming commercial break. In some embodiments, the process compares the potential advertisements in the break data with the advertisement media files stored in the STB to identify one or more advertisements to be played at the STB during the upcoming commercial break and at the play out time specified in the cue data, playing the one or more advertisements during the commercial break.

Figure 5A:
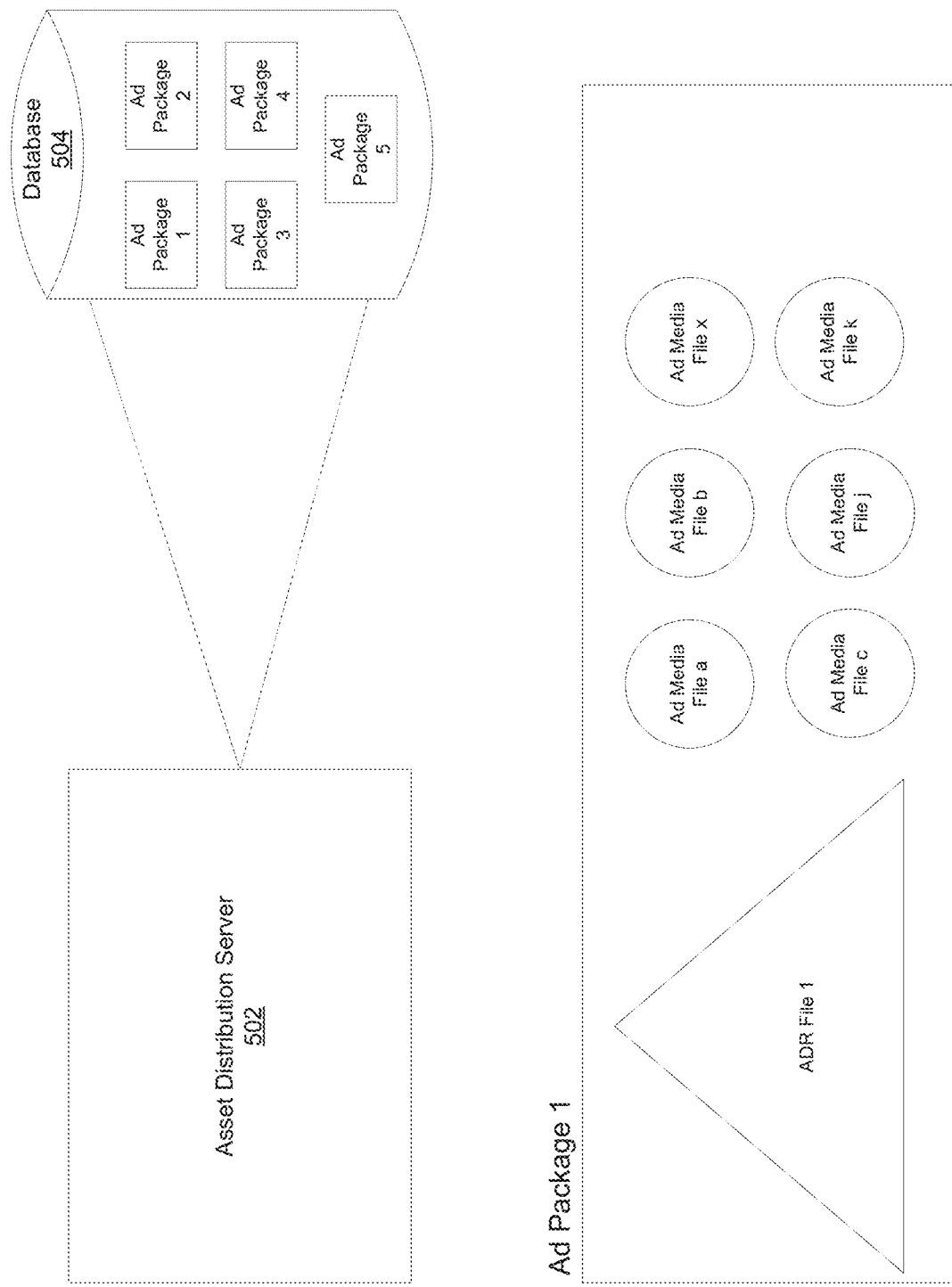
FIG. 5A and FIG. 5B depicts an illustrative use-case showing how the IP-based asset package distribution system works, according to some embodiments of the disclosed technology.
Figure 5B:
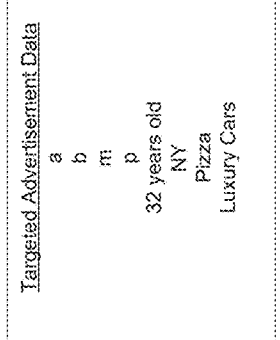
Figure 5B:
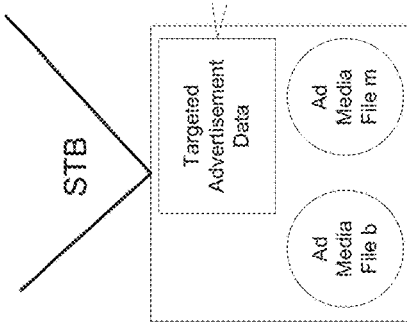

FIG. 5A and FIG. 5B depicts an illustrative use-case showing how the IP-based asset package distribution system works, according to some embodiments of the disclosed technology. FIG. 5A shows an asset distribution server (e.g., asset distribution server in FIG. 1) coupled to a database 504 that includes advertisement packages. For example, database 504 includes Ad Package 1, Ad Package 2, Ad Package 3, Ad Package 4, and Ad Package 5. As an example, Ad Package 1 includes ADR File 1, AD Media File a, Ad Media File b, Ad Media File x, Ad Media File c, Ad Media File j, and Ad Media File k. Turning to FIG. 5B, ADR File 1 includes data related to a few ADR IDs. For example, ADR File 1 includes three ADR IDs. The first ADR ID is ab {30-40, NY, working professional, October 1-December 5} and other metadata. It will be understood that the portion included within curly braces is also metadata associated with a subscriber. Two other ADR IDs are also shown to be included in ADR File 1. FIG. 5B also shows a STB storing targeted advertisement data. Examples of targeted advertisement data includes ad media files a, b, m, and p. Targeted advertisement data also includes 32 years old, NY, Pizza, Luxury cars. FIG. 5B also includes a legend describing ad media files. For example, ad media file a corresponds to Lexus, ad media file b corresponds to Papa John's Pizza, ad media file x corresponds to Kennedy Center and so on. Thus, ad media files can correspond to different types of advertisements. After receiving the ADR File with ADR IDs, the STB correlates targeted advertisement data with the metadata associated with the ADR ID to determine ADR IDs of relevant advertisement media files that are pertinent to the STB. For example, if the outcome of the correlation is greater than a threshold, then the STB determines such advertisement media files to be pertinent. As an another example, if a targeted advertisement has a higher priority than another targeted advertisement, then the STB determines the targeted advertisement to be pertinent for the STB. As yet another example, the STB gives greater priority to age or other demographic parameters in the metadata, for determining which targeted advertisement are pertinent for the STB. Then, the STB compares (i) the ADR IDs of relevant advertisement media files that are pertinent to the STB with (ii) previously-stored advertisement media files in the STB to identify one or more missing ADR IDs, wherein the one or more missing ADR IDs correspond to advertisement media files that are not stored in the STB. After determining one or more missing ADR IDs corresponding to advertisement media files that are not stored in the STB, those advertisement media are requested for download from the remote server for storage at the STB.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols. For example, the communications can include any combination of local area and/or wide area networks, using wired and/or wireless communication systems. The networks could use any or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over the one or more networks may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of facilitating faster provisioning of targeted advertisements at a set-top box (STB) via an Internet Protocol (IP) connection between the STB and a remote server, wherein the STB is configured to have a satellite connection, the method comprising:
   monitoring, by the STB, an announcement stream on a satellite connection, wherein the announcement stream is a broadcast announcing a list of available advertisement packages, wherein each advertisement package is a bundled collection of an advertisement delivery request (ADR) file and advertisement media files applicable for playing at the STB;
   based on monitoring the announcement stream, building or updating, by the STB, a lookup table locally stored at the STB with information identifying the list of the available advertisement packages for potential acquisition by the STB;
   providing, by the STB, an ID of each advertisement package listed in the lookup table to the remote server;
   receiving, by the STB and from the remote server, an ADR file corresponding to the ID of each advertisement package listed in the lookup table, wherein the ADR file includes identifiers (ADR IDs) of advertisement media files and metadata associated with each ADR ID;
   receiving, by the STB and from the remote server, targeted advertisement data and storing, by the STB, the targeted advertisement data in a storage location electronically coupled to the STB;
   for each advertisement package listed in the lookup table and for each ADR ID in the ADR file of the advertisement package, correlating, by the STB, targeted advertisement data with the metadata associated with the ADR ID to determine ADR IDs of relevant advertisement media files that are pertinent to the STB, wherein said correlating comprises:
      executing, by the STB, a correlating algorithm, said correlating algorithm generating an outcome of correlating the targeted advertisement data with the metadata associated with the ADR ID, measuring that the outcome is greater than a pre-determined threshold, and determining that the targeted advertisement data is pertinent for the STB;
   comparing, by the STB, (i) the ADR IDs of relevant advertisement media files that are pertinent to the STB with (ii) previously-stored advertisement media files in the STB to identify one or more missing ADR IDs, wherein the one or more missing ADR IDs correspond to advertisement media files that are not stored in the STB; and
   requesting, by the STB, advertisement media files corresponding to the one or more missing ADR IDs from the remote server for storage at the STB.

2. The method of claim 1, wherein the information identifying the list of the available advertisement packages includes: an advertisement package ID, names and types of advertisement media files associated with an advertisement package, a time of acquisition of an advertisement package, and an indication of whether an advertisement package is available via the satellite connection or the IP connection.

3. The method of claim 1, wherein the storage location includes non-volatile memory, Flash memory, DRAM memory, or a hard drive.

4. The method of claim 1, wherein the metadata associated with each ADR ID is based on: an order of playout of the targeted advertisements, a geographic location where the STB is located, tags denoting the targeted advertisement data, a priority of a targeted advertisement, a start/end date of the targeted advertisement, and a maximum number of playouts of the targeted advertisement.

5. The method of claim 1, wherein the targeted advertisement data is updated on a temporal basis, and wherein the targeted advertisement data is based on: a model type of the STB, a geographical region where the STB is located, past-viewed programming content on the STB, demographic information of an operator of the STB, and lifestyle information of the operator of the STB.

6. The method of claim 1, wherein the IP connection is a scalable connection that is agnostic to a total number of STBs deployed.

7. The method of claim 1, wherein the IP connection is secured via a Secure Sockets Layer (SSL) connection for encrypting the advertisement media files.

8. The method of claim 1, further comprising:
establishing the IP connection between the STB and the remote server; and in an event of a failure in the IP connection, establishing connectivity via the satellite connection.

9. The method of claim 1, wherein the satellite connection includes an additional reception stream, wherein the additional reception stream includes:
(i) break data specifying potential advertisements to be played in an upcoming commercial break and
(ii) cue data specifying a play out time in the upcoming commercial break.

10. The method of claim 9, further comprising:
comparing the potential advertisements in the break data with the advertisement media files stored in the STB to identify one or more advertisements to be played at the STB during the upcoming commercial break and at the play out time specified in the cue data, playing the one or more advertisements during the commercial break.

11. The method of claim 1, wherein requesting advertisement media files corresponding to the one or more missing ADR IDs from the remote server is sent via an application programing interface (API) electronically coupled to the STB.

12. A non-transitory computer-readable storage medium storing instructions configured for facilitating faster provisioning of targeted advertisements at a set-top box (STB) via an Internet Protocol (IP) connection between the STB and a remote server, wherein the STB is configured to have a satellite connection, to perform a method comprising:
monitoring, by the STB, an announcement stream on the satellite connection, wherein the announcement stream is a broadcast announcing a list of available advertisement packages, wherein each advertisement package is a bundled collection of an advertisement delivery request (ADR) file and advertisement media files applicable for playing at the STB;
based on monitoring the announcement stream, building or updating, by the STB, a lookup table locally stored at the STB with information identifying the list of the available advertisement packages for potential acquisition by the STB;
providing, by the STB, an ID of each advertisement package listed in the lookup table to the remote server;
receiving, by the STB and from the remote server, an ADR file corresponding to the ID of each advertisement package listed in the lookup table, wherein the ADR file includes identifiers (ADR IDs) of advertisement media files and metadata associated with each ADR ID;
receiving, by the STB and from the remote server, targeted advertisement data and storing, by the STB, the targeted advertisement data in a storage location electronically coupled to the STB;
for each advertisement package listed in the lookup table and for each ADR ID in the ADR file of the advertisement package, correlating, by the STB, targeted advertisement data with the metadata associated with the ADR ID to determine ADR IDs of relevant advertisement media files that are pertinent to the STB, wherein said correlating comprises:
executing, by the STB, a correlating algorithm, said correlating algorithm generating an outcome of correlating the targeted advertisement data with the metadata associated with the ADR ID, measuring that the outcome is greater than a pre-determined threshold, and determining that the targeted advertisement data is pertinent for the STB;
comparing, by the STB, (i) the ADR IDs of relevant advertisement media files that are pertinent to the STB with (ii) previously-stored advertisement media files in the STB to identify one or more missing ADR IDs, wherein the one or more missing ADR IDs correspond to advertisement media files that are not stored in the STB; and
requesting, by the STB, advertisement media files corresponding to the one or more missing ADR IDs from the remote server for storage at the STB.

13. The non-transitory computer-readable storage medium of claim 12, wherein the information identifying the list of the available advertisement packages includes: an advertisement package ID, names and types of advertisement media files associated with an advertisement package, a time of acquisition of an advertisement package, and an indication of whether an advertisement package is available via the satellite connection or the IP connection.

14. The non-transitory computer-readable storage medium of claim 12, wherein the storage location includes non-volatile memory, Flash memory, DRAM memory, or a hard drive.

15. The non-transitory computer-readable storage medium of claim 12, wherein the metadata associated with each ADR ID is based on: an order of playout of the targeted advertisements, a geographic location where the STB is located, tags denoting the targeted advertisement data, a priority of a targeted advertisement, a start/end date of the targeted advertisement, and a maximum number of playouts of the targeted advertisement.

16. A set-top box (STB) apparatus for facilitating faster provisioning of targeted advertisements at a set-top box (STB) via an Internet Protocol (IP) connection between the STB and a remote server, wherein the STB is configured to have a satellite connection, comprising:
a memory;
one or more processors electronically coupled to the memory and configured for:
monitoring, by the STB, an announcement stream on the satellite connection, wherein the announcement stream is a broadcast announcing a list of available advertisement packages, wherein each advertisement package is a bundled collection of an advertisement delivery request (ADR) file and advertisement media files applicable for playing at the STB;
based on monitoring the announcement stream, building or updating, by the STB, a lookup table locally stored at the STB with information identifying the list of the available advertisement packages for potential acquisition by the STB;

providing, by the STB and from the remote server, an ID of each advertisement package listed in the lookup table to the remote server;

receiving, by the STB, an ADR file corresponding to the ID of each advertisement package listed in the lookup table, wherein the ADR file includes identifiers (ADR IDs) of advertisement media files and metadata associated with each ADR ID;

receiving, by the STB and from the remote server, targeted advertisement data and storing, by the STB, the targeted advertisement data in a storage location electronically coupled to the STB;

for each advertisement package listed in the lookup table and for each ADR ID in the ADR file of the advertisement package, correlating, by the STB, targeted advertisement data with the metadata associated with the ADR ID to determine ADR IDs of relevant advertisement media files that are pertinent to the STB, wherein said correlating comprises:

executing, by the STB, a correlating algorithm, said correlating algorithm generating an outcome of correlating the targeted advertisement data with the metadata associated with the ADR ID, measuring that the outcome is greater than a pre-determined threshold, and determining that the targeted advertisement data is pertinent for the STB;

comparing, by the STB, (i) the ADR IDs of relevant advertisement media files that are pertinent to the STB with (ii) previously-stored advertisement media files in the STB to identify one or more missing ADR IDs, wherein the one or more missing ADR IDs correspond to advertisement media files that are not stored in the STB; and requesting, by the STB, advertisement media files corresponding to the one or more missing ADR IDs from the remote server for storage at the STB.

17. The STB apparatus of claim 16, wherein the information identifying the list of the available advertisement packages includes: an advertisement package ID, names and types of advertisement media files associated with an advertisement package, a time of acquisition of an advertisement package, and an indication of whether an advertisement package is available via the satellite connection or the IP connection.

18. The STB apparatus of claim 16, wherein the storage location includes non-volatile memory, Flash memory, DRAM memory, or a hard drive.

19. The STB apparatus of claim 16, wherein the metadata associated with each ADR ID is based on: an order of playout of the targeted advertisements, a geographic location where the STB is located, tags denoting the targeted advertisement data, a priority of a targeted advertisement, a start/end date of the targeted advertisement, and a maximum number of playouts of the targeted advertisement.

20. The STB apparatus of claim 16, wherein the targeted advertisement data is updated on a temporal basis, and wherein the targeted advertisement data is based on: a model type of the STB, a geographical region where the STB is located, past-viewed programming content on the STB, demographic information of an operator of the STB, and lifestyle information of the operator of the STB.

\* \* \* \* \*